Aug. 28, 1951 R. E. EAVES 2,566,124

ADVERTISING DEVICE

Filed March 17, 1949 2 Sheets-Sheet 1

INVENTOR.
Ralph E. Eaves
BY Heard Smith & Tennant
Attorneys.

Aug. 28, 1951 R. E. EAVES 2,566,124

ADVERTISING DEVICE

Filed March 17, 1949 2 Sheets-Sheet 2

INVENTOR.
Ralph E. Eaves
BY Heard Smith & Tennant
attorneys.

Patented Aug. 28, 1951

2,566,124

UNITED STATES PATENT OFFICE 2,566,124

ADVERTISING DEVICE

Ralph E. Eaves, Westwood, Mass.

Application March 17, 1949, Serial No. 81,959

6 Claims. (Cl. 40—34)

This invention relates to a display or advertising service.

One of the objects of the invention is to provide a display device which will attract and hold the attention of observers.

Another object of the invention is to provide a display device by which the attention of the observer is attracted and held by creating in the observer the illusion that an inanimate subject being displayed has movement.

A further object of the invention is to provide a display device for advertising purposes which is so constructed that the article or advertisement being displayed will appear to the observer to vary in size, that is, to either increase or decrease in size.

These objects are obtained by first producing in an observer the illusion of objects moving either toward a receding center or away from an advancing center and then interposing the advertisement in the observer's line of vision thereby producing the illusion of the advertisement increasing or decreasing in size.

The means I prefer to use to give the observer the illusion of articles moving toward a receding center or away from an advancing center is a rotary disk which carries on its face a spiral band that spirals outwardly from the center of the disk to the periphery and has a progressively increasing width from its inner end to its outer peripheral end, together with means to rotate the disk at a proper speed to produce the above illusion. When such a disk is rotated in one direction, the observer gets the illusion of a disk with a receding center and of a movement from the periphery of the disk towards the apparently receding center. When the disk is rotated in the other direction, the illusion is created of the center of the disk moving towards the observer and of a radial movement from the apparently advancing center towards the periphery of the disk.

The display member, whether it be an article to be displayed or a card or sheet carrying advertising matter, is mounted on a movable supporting member, and means are provided for moving said supporting member from an inoperative position in which the display member is out of the line of vision of an observer viewing the rotating disk into an operative or display position in which said display member is in said line of vision and is interposed between the observer and the disk, the display member preferably having the characteristic that when it is in its operative display position, it obscures the observer's view of the disk.

After the observer has been looking at the rotating disk for a short time interval, on the order of twenty or thirty seconds, the sudden substitution of the display member for the rotary disk in the observer's line of vision has a dynamic effect on the observer and gives him the illusion of an animated display member which is varying in size. If the disk is rotated in a direction to create in the observer the illusion of a disk having a receding center and of a movement from the periphery of the disk towards such receding center, the illusion which the observer receives when the display member is suddenly substituted for the rotating disk is that of a display member which is increasing in size or apparently moving toward the observer.

On the other hand if the disk is rotated in a direction to create in the observer the illusion that the center of the disk is approaching him and of a movement from the apparently advancing center of the disk toward the periphery thereof, then when the display member is suddenly moved into its display position in front of the disk, the observer will have the illusion that the display member is receding from him and is shrinking or decreasing in size.

As a result of these illusions the display will not only attract the attention of observers, but will hold their attention much longer than if no such illusion existed.

In order to hold the attention of observers for considerable periods of time, it is proposed to provide means whereby the display will be moved alternately and repeatedly into first its inoperative position and then into its display position, and will be maintained in each position for a predetermined time interval on the order of thirty seconds or so.

Means are also preferably provided for controlling the disk rotating means so that the latter will be operative to rotate the disk when the display member is in its inoperative position and will be inoperative for this purpose when the display member is in its operative display position.

In the drawings, wherein I have illustrated a selected embodiment of my invention, Fig. 1 is a front view of a device embodying the invention with the display member in its inoperative position.

Figure 1:
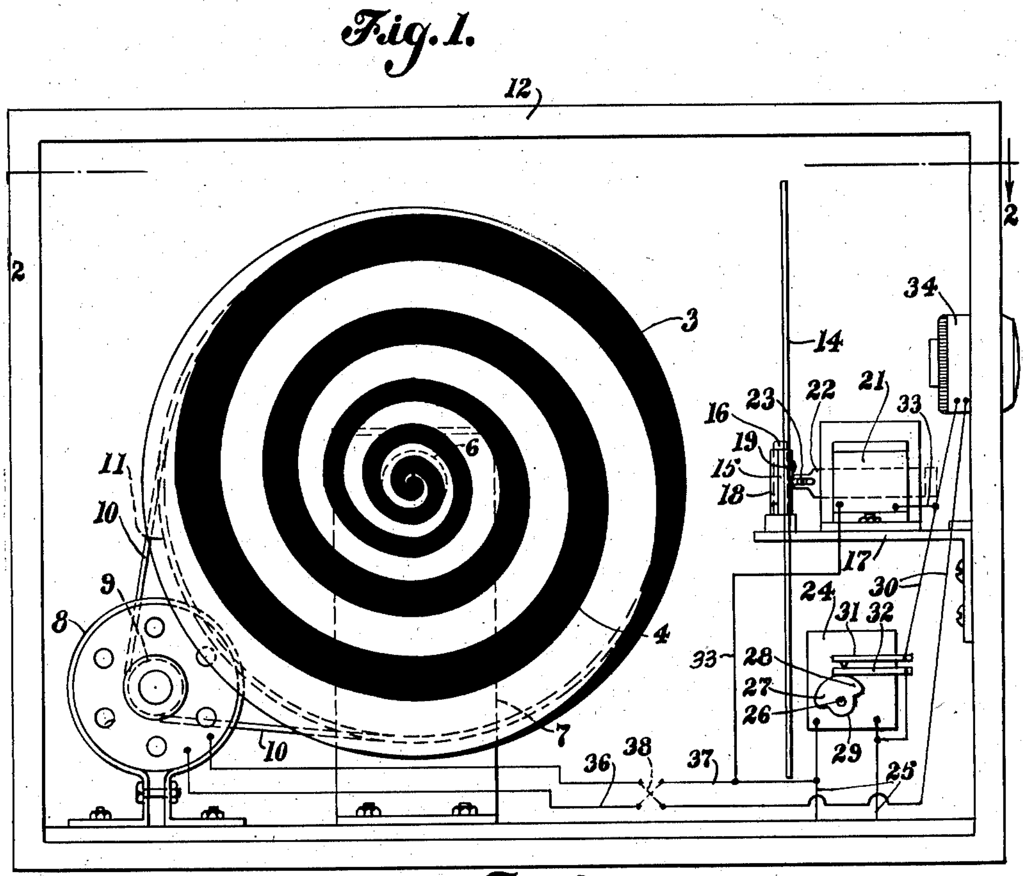

In the drawings 3 indicates a disk having on its face a band 4 which spirals from the center of the disk to the periphery, said band having a progressively increasing width from its inner end to its peripheral end. This band may be of any desired color, but it will have a color contrasting with that of the disk. A very satisfactory disk is one which has a white face on which is painted or printed the band 4 in black or some dark color.

The disk is carried by a rotatable shaft 5 which is mounted in bearings 6 in a supporting frame 7.

Means are provided for rotating the shaft 5 and thereby rotating the disk 3, and one convenient means for this purpose includes a motor 8 having a pulley 9 on its shaft which is connected by a driving belt 10 to a large pulley 11 fast on the shaft 5. The mounting for the disk 3 and the motor 8 for driving it may conveniently be housed in a housing or casing 12, the casing herein shown being open at the front as shown at 13 so as to permit an observer to readily view the disk 3. When a disk such as herein shown is rotated clockwise, an observer viewing the rotating disk has the illusion of the center of the disk receding or moving away from him and also of a general movement from the periphery of the disk toward the receding center.

On the other hand if the disk is rotated counterclockwise a person viewing the disk will have the illusion of the center of the disk advancing or moving towards him and of a general movement from the center of the disk toward the periphery.

Associated with the disk as above described is a display member which may be an object which is being displayed or advertised, or it may be a sheet or card carrying a picture or advertising matter.

In the construction herein illustrated the display member is in the form of a card 14 on which is printed some advertising or other matter which is to be displayed. Merely for illustrative purposes such matter is indicated by the two words "Advertisement" which are printed on the face of the card or display member 14. Said display member 14 is mounted on a movable support 15 which is herein shown as an arm or bar that is pivotally mounted on a post 16 carried by a supporting bracket 17 that is secured to one side wall of the casing 12. The arm 15 is shown as having at its end a hub portion 18 through which the post 16 extends. Said supporting member 15 can thus swing about an axis at right angles to the axis of the disk and in one position, the inoperative position shown in Fig. 1, the supporting member 15 extends forwardly from its pivotal post 16 towards the observer and substantially parallel to the shaft 5. When the supporting member 15 is in this position, the display card 14 occupies a plane at right angles to the plane of the disk 3 and parallel to the line of vision of an observer so that the observer sees only the edge of the display card 14.

When the supporting member 15 is swung about its pivot 16 into its operative display position, it will be located directly in front of the disk 3 and extend parallel to the face thereof, and when in this position, the display card 14 will be located parallel to the disk 3 and directly in front of the disk.

The display card 14 is preferably of such a size that when it is in its operative position, it will obscure the observer's view of the disk 3 so that the observer sees only the display member.

Means are provided for moving the supporting member 15 and the display member 14 mounted thereon alternately into their inoperative position and their display position, said means being so constructed that the display member and its support 15 will remain at rest for a predetermined time interval in each position.

Figures 3, 4, 5:
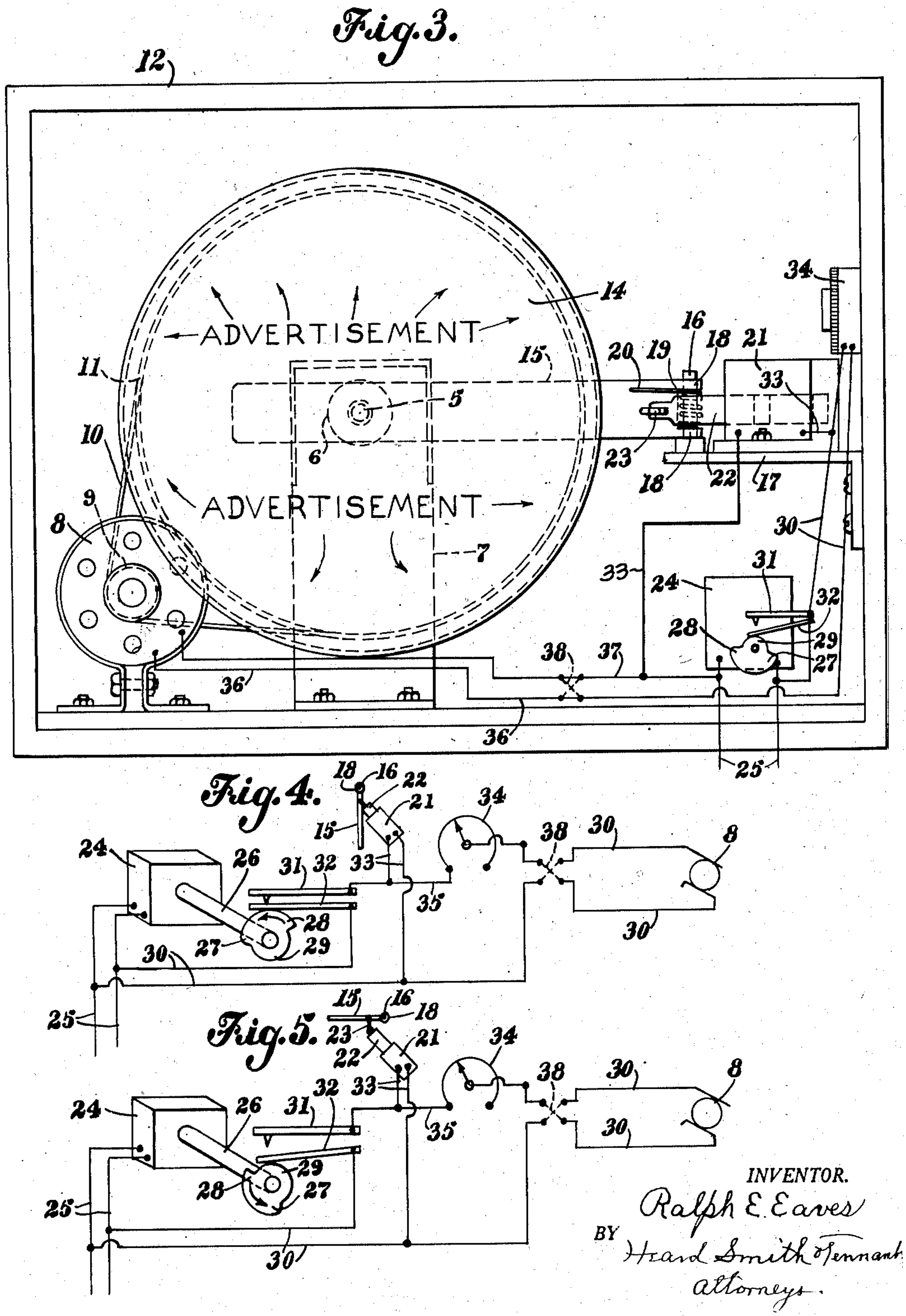
Fig. 3 is a view similar to Fig. 1 but showing the display member in its operative display position.
Figs. 4 and 5 are diagrammatic views showing the wiring system for the apparatus.

The supporting member 15 is shown as acted upon by a spring 19 which is coiled about the post 16 and one end of which is anchored to the bracket 17 and the other end 20 of which bears against the supporting member 15, said spring tending normally to swing the supporting member 15 from its inoperative position shown in Fig. 1 to its display position shown in Fig. 3.

For moving the supporting member and display card from the display position shown in Fig. 3 back to the inoperative position shown in Fig. 1, I have provided a solenoid 21 which is carried by the supporting bracket 17, and the core 22 of which is connected by a link 23 with the supporting member 15.

Figure 2:
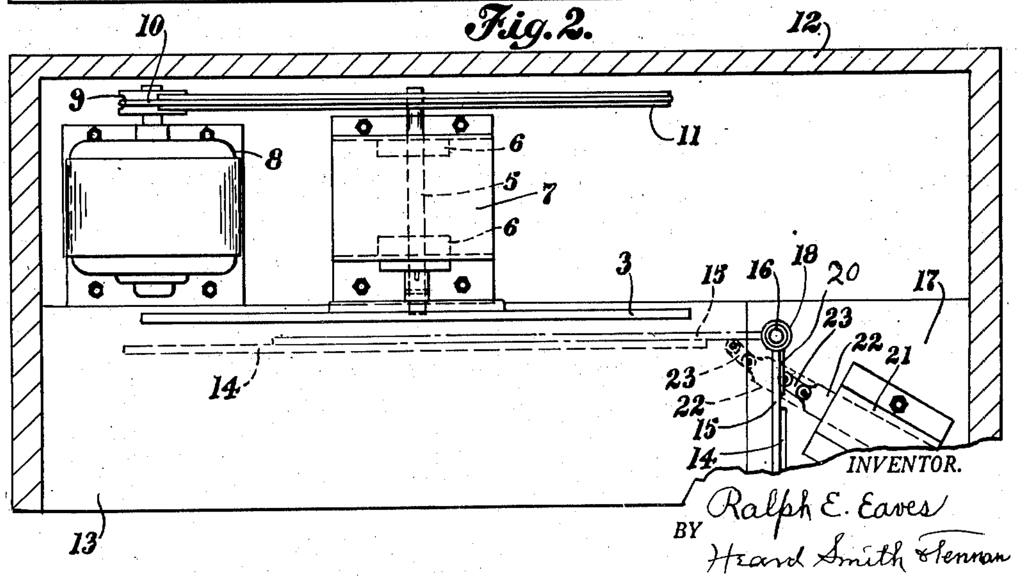
Fig. 2 is a section on the line 2—2, Fig. 1.

When the supporting member and the display member 14 are in their display position shown in Fig. 3, the core 22 of the solenoid will be in a projected position as shown by dotted lines in Fig. 2. When the solenoid is energized, the core 22 is pulled into the coils of the solenoid as shown in full lines in Figs. 1 and 2, and by this movement the supporting member 15 with the display card 14 is swung from the dotted line position, Fig. 2, into the full line position. So long as the solenoid is energized the supporting member 15 with its display card 14 will be held in the inoperative position, but as soon as the solenoid is de-energized, the spring 19 will swing the supporting member 15 and the display card carried thereby into the display position shown in Fig. 3.

I have provided herein means whereby the solenoid is energized at predetermined time intervals and is maintained energized for a predetermined length of time and is then de-energized and maintained inactive for a predetermined time interval, so that the display member will be automatically moved into its inoperative position and held there for a predetermined time interval and then will be released and moved by the spring into its display position and held there for a predetermined time interval, after which it is again moved back into its inoperative position, etc.

While any suitable means for accomplishing this end may be provided, I have herein shown a Telechron motor 24 which is connected to an operating circuit 25. The Telechron motor drives a shaft 26 on which is mounted a cam member 27 that is formed with a high portion 28 and a low portion 29. Said cam member 27 controls contacts 31, 32 which are in the circuit 30 of the motor 8, the arrangement shown being such that when the contact 32 engages the high portion 28 of the cam the contacts will be closed thereby closing the motor circuit as shown in Fig. 4, while when the contact 32 is in engagement with the low portion 29 of the cam, the contacts will be open thereby opening the motor circuit as shown in Fig. 5.

The solenoid 21 is connected in parallel with the motor by wire connections 33 which lead off from the motor circuit between the switch contacts 31, 32 and the motor as shown best in Figs. 4 and 5.

With this arrangement when the motor circuit 30 is closed as shown in Fig. 4, the solenoid 21 will be energized and the supporting member 15 will be held by the energized solenoid in its inoperative position shown in Fig. 1. On the other hand when the switch contacts 31, 32 are open and the motor circuit is opened, the solenoid will also be de-energized as shown in Fig. 5 and in Fig. 3, and the spring 19 will thus act automatically to swing the supporting member 15 with the display card 14 into operative display position.

The motor circuit also includes a rheostat 34 by which the speed of the motor can be controlled, and if desired a reversing switch 38 may be placed in the motor circuit to provide for reversing the direction of the motor and hence the direction of rotation of the disk 3.

Assuming that the reversing switch 38 is set to rotate the motor and the shaft 5 clockwise and that the contacts 31, 32 are closed by the cam 27 as shown in Figs. 1 and 4, the motor will then be in operation, the solenoid 21 will be energized and the supporting member 15 with the display member 14 will be held in their inoperative position shown in Fig. 1. If at this time the observer is viewing the rotating disk, he will have the illusion that the center of the disk is receding and that there is a movement from the peripheral portions of the disk toward the receding center.

The Telechron clock movement 24 will rotate the cam 27 at a constant speed and when it arrives at a position in which the contact 32 drops off from the high portion 28 of the cam onto the low portion 29, the circuit of both the motor and the solenoid is broken, and said solenoid is therefore de-energized. When this happens the spring 19 acts immediately to swing the supporting member 15 with the display card 14 thereon into the display position shown in Fig. 3, in which position it obstructs the observer's view of the disk. When the display member is thus substituted in the observer's vision for the rotating disk, the observer has the illusion of a display member which is expanding in all directions from the center or increasing in size and moving toward the observer. This illusion will persist for twenty or thirty seconds and at the end of such time interval the cam 27 again closes the contacts 31, 32 thus closing the motor circuit and energizing the solenoid 21 which operates to swing the supporting member 15 back into its inoperative position, thus exposing the disk to the view of the observer.

Since both the motor 8 and the solenoid are controlled by the switch 31, 32, the motor will be inactive during the time that the display member 14 is in its display position, but when the solenoid circuit is again closed by the cam 27, the motor circuit will also be closed and the motor will immediately start the disk 3 in rotation so that when the display member swings into its inoperative position, the observer sees the rotating disk, and again the illusion is created of the center of the disk receding and also of a general movement from the periphery toward the center of the receding disk. Hence each time that the display card is moved into its display position, it appears to be animated in the sense that it appears to increase in size and to move toward the observer.

The alternate illusions which the observer thus receives are such as to hold his attention for considerable periods of time thus increasing the effect of the device as an advertising or display device.

If the reversing switch 38 is set so as to rotate the disk 3 in a counterclockwise direction, then, as stated above, the observer has the illusion of the center of the disk approaching him or advancing and of a general movement from the center to the periphery of the disk. When the device is operated in this way and the display card is moved into display position, the observer has the illusion of the display member decreasing in size and moving away from him.

The disk 3 may be of any size depending on the distance at which it is to be placed from the observer. If the installation is one in which the observer is only a few feet from the device, a disk of ten or twelve inches in diameter will be satisfactory, but if the device is to be placed a considerable distance from the observer, as for instance in an elevated position or on top of a building, a disk several feet in diameter will be required to produce the desired effect.

I claim:

1. A display device comprising means for producing in an observer the illusion of objects moving towards or from a central point, a display member, means supporting said display member for movement between in inoperative position in which it is out of the observer's line of vision of said illusion-producing means and a display position in which it is in said line of vision and obscures the observer's view of the illusion-producing means, and means for periodically moving said display member from one position to the other and maintaining it at rest for an interval of time in each position.

2. A display device comprising a disk having on its face a band which spirals from the center to the periphery thereof, means to rotate said disk thereby to give an observer the illusion of the center of the disk moving away from or towards him depending on the direction of rotation of the disk, a display member, means supporting the display member for movement between an inoperative position in which it is out of the observer's line of vision of said disk and a display position in which it is in said line of vision and obscures the observer's view of the disk, and means to move said display member repeatedly and alternately from one position to the other and to maintain it at rest in each position for a predetermined interval of time.

3. A display device comprising a disk having on its face a band which spirals from the center to the periphery thereof, means to rotate said disk thereby to give an observer the illusion of the center of the disk moving away from or towards him depending on the direction of rotation of the disk, a display member, means pivotally mounting the display member for swinging movement between an inoperative position in which it is out of the observer's line of vision of said disk and a display position in which it is in said line of vision, and means to move said display member alternately from one position to the other with a period of rest in each position.

4. A device of the class described comprising a disk having on its face a band which spirals from the center thereof to the periphery, disk rotating means operative to rotate the disk in a direction to give an observer the illusion of movement from the periphery of the disk toward a receding central point, a display card containing matter to be displayed, means supporting said display card for movement between an inoperative position in which it is out of the observer's line of vision of the disk into a display position in which it is in said line of vision, whereby when said display card has been moved into display position the observer has the illusion of a movement of the card toward him.

5. A device of the class described comprising a rotary disk having on its face a band which spirals from the center of the disk to the periphery thereof, disk rotating means, a display card, means supporting said display card for movement between an inoperative position out of the line of vision of an observer looking at the disk and an operative position in said line of vision, said display card when in display position obscuring the observer's view of the disk, means to render the disk rotating means alternately operative and inoperative at predetermined time intervals, and means to move the display card into inoperative position when the disk-operating means in operating and into display position when the disk-operating means is inoperative.

6. A device of the class described comprising a disk having on its face a band which spirals from the center thereof to the periphery, means to rotate the disk and thereby give an observer the illusion of the center of the disk moving axially thereof and a general movement radially of the disk, a display card containing matter to be displayed, means supporting said display card for movement between an inoperative position in which it is out of the observer's line of vision of the disk into a display position in which it is in said line of vision, whereby when said display card has been moved into display position, the observer has the illusion of a movement of the display card in the axial line of the disk.

RALPH E. EAVES.

REFERENCES CITED

The following references are of record in the file of this patent:

UNITED STATES PATENTS

| Number | Name | Date |
|---|---|---|
| 860,795 | Franklin | July 23, 1907 |
| 1,009,839 | Hata | Nov. 28, 1911 |